United States Patent [19]

Hamilton

[11] 3,867,123
[45] Feb. 18, 1975

[54] MOLD OPERATING MECHANISM
[75] Inventor: Joseph R. Hamilton, Anderson, Ind.
[73] Assignee: Lynch Corporation, Anderson, Ind.
[22] Filed: Aug. 13, 1973
[21] Appl. No.: 387,694

[52] U.S. Cl. .................................. 65/359, 65/360
[51] Int. Cl. ............................................ C03b 9/00
[58] Field of Search ..................... 65/360, 359, 357

[56] References Cited
UNITED STATES PATENTS

| | | | |
|---|---|---|---|
| 1,995,653 | 3/1935 | Rowe | 65/360 X |
| 2,304,736 | 12/1942 | Louden et al. | 65/360 X |
| 2,942,382 | 6/1960 | Hamilton | 65/360 |
| 3,528,796 | 9/1970 | Trahan | 65/360 X |

Primary Examiner—S. Leon Bashore
Assistant Examiner—Frank W. Miga
Attorney, Agent, or Firm—Molinare, Allegretti Newitt & Witcoff

[57] ABSTRACT

A mechanism for opening and closing the molds of a glass molding machine, particularly of the continuous motion type. The mechanism includes a support member which is mounted on a continuously rotating, horizontally mounted table of the glass molding machine. A pair of mating mold members are pivotally mounted on the support and cooperate to define an upper opening therein. A drive cylinder moves the mold members between a closed position during which molten glass is received and during which the glass product is formed, and an open position during which the molded glass product is removed. Link members operatively connect each of the cooperating mold members with a drive cylinder and pivotally open and close the mold members. Cooperating mold locking members are provided on the moving link members and on the fixed support member and cooperate to positively lock the mold members in the closed position while resisting large internal forces which tend to open the mold halves. The cooperating locking members also are constructed and arranged to effect a release of the mold members from the locked and closed position in response to relatively small opening forces from the drive means to permit the removal of the formed or molded product therefrom.

12 Claims, 11 Drawing Figures

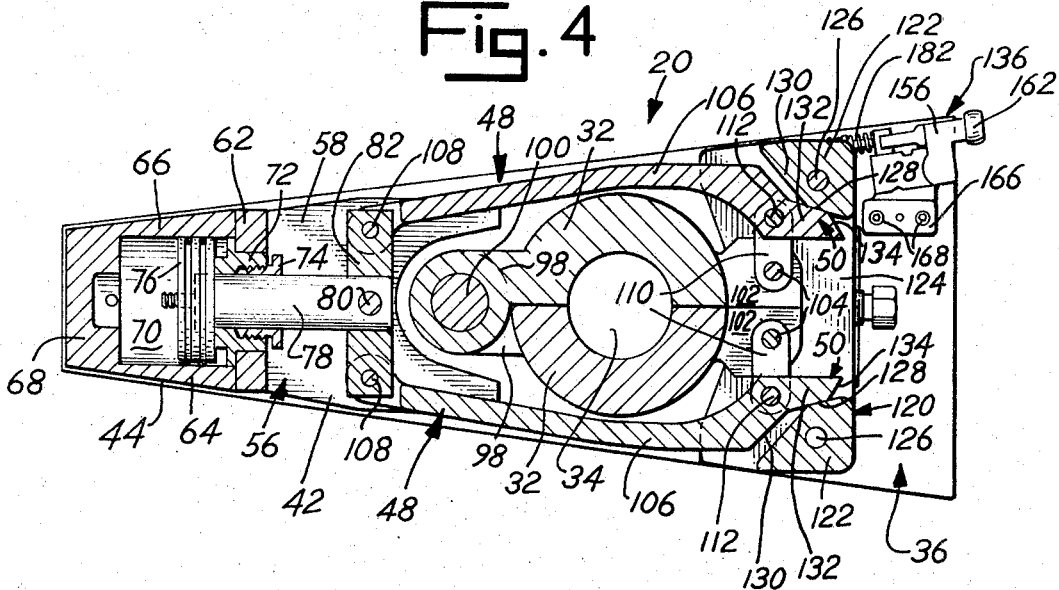
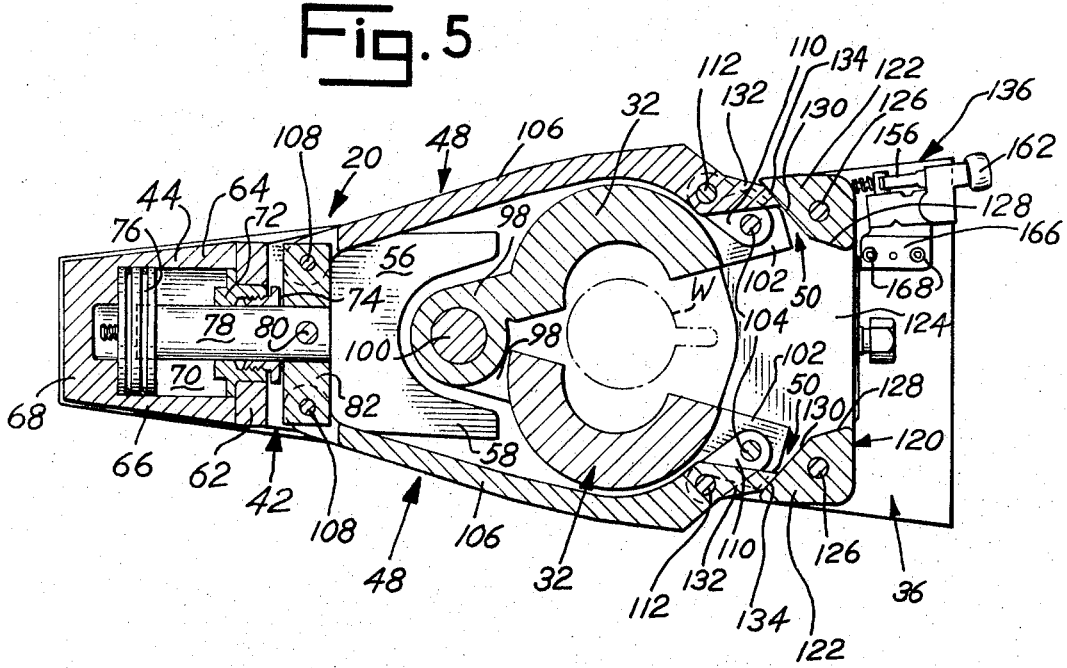

MOLD OPERATING MECHANISM

BACKGROUND OF THE INVENTION

FIELD OF THE INVENTION

DESCRIPTION OF THE PRIOR ART

This invention relates to a mold operating mechanism and it particularly relates to a mechanism for opening and closing a pair of cooperating, movable mold members in a glass molding machine, particularly of the continuous motion type.

Glass molding machines are, generally speaking, of three types. One type is an indexing or intermittently operating type of glass molding machine. In these indexing machines, the mold defines an upwardly opening top and is carried to a position below the delivery area. The mold is stopped momentarily as a molten glass gob is dropped into the open top of the mold by a delivery mechanism. Following delivery of the glass gob, the machine indexes and a ram or plunger is brought down forcibly into the mold to form the glass product between the walls of the mold cavity and the plunger or ram. The machine continues indexing until the product is cooled and formed, and removed from the mold.

The second general type of glass making machine is a continuous motion press wherein the molds are in continuous rotary, horizontal motion. The glass is dropped into the molds while they are in motion. While the molds are in motion, a ram or plunger is moved down into the mold cavity for the formation of the glass product in the mold. The product is cooled, set, and thereby formed. As the molds are moved the set glass product or ware is removed. The continuous motion type press provides a higher production rate than the indexing type. Other advantages of the continuous motion press over the intermittent or indexing type are that more time is available for cooling the ware so that an improved product results, and the operation of the machine is smoother and easier on the equipment because the massive equipment is not constantly undergoing changes in inertia, that is, starting and stopping, as in an indexing machine.

The third general type of glass making machine is an individual section machine wherein the molds are on a stationary table. The glass gob is dropped into the molds, and a ram or plunger is moved down into the mold cavity for the formation of the glass product in the mold. The product is cooled, set, and thereby formed. The plunger is moved up out of the mold, the molds are opened and the product is removed by means of a separate takeout mechanism.

Although the continuous motion type press has significant advantages over the indexing or intermittently operating type and the individual section type, the general practice has been to use the indexing type or individual section type rather than the continuous motion type because of certain operational problems encountered with the continuous motion type.

In my copending patent application Ser. No. 295,164, filed Oct. 5, 1972, entitled "Continuous Motion Glass Molding Machine", a new glass molding machine, generally considered to overcome many of the disadvantages and drawbacks of prior art continuous motion machines is described in detail. In my said prior application, the molds which are shown and described are unitary and are capable of forming glass articles in an upwardly and outwardly tapered mold. In this type of mold, after the ware or glass product is formed, a ram lifts the ware directly upwardly out of the tapered mold and the ware, as a tumbler, is picked up by a take-out mechanism and moves it to a conveyor for further handling and ultimate packaging. The unitary molds shown in my said prior application are not capable of handling glassware with appendages such as handles on cups and mugs and the like, because the glass handle cannot be lifted straight out of the mold. It is thus clearly highly desirable to provide a continuous motion press which not only molds glassware in unitary, upwardly tapered molds, but which is also capable of molding glassware with handles or the like by providing a mold which includes movable mold defining members to permit removal of such glassware.

SUMMARY OF THE INVENTION

It is therefore an important object of this invention to provide a mechanism for opening and closing mold members of the type used in glass making machines.

It is also an object of this invention to provide a mechanism for opening and closing mold members wherein the mechanism is characterized by a linkage which locks the mold members in the closed position while using relatively little closing pressure and wherein the mechanism is so designed that the opening of the mold is accomplished with a relatively small amount of force needed to release the locking mechanism which holds the mold members closed.

It is a further object of this invention to provide a mold operating linkage which opens and closes a pair of mold members in a glass molding machine wherein the operating linkage is designed to serve an additional function of cooperating with the cooling wind channels for directing the cooling wind or air directly against the mold for providing sufficient cooling of the mold in the closed position.

It is still another object of this invention to provide a mold for use in a continuous motion glass making machine wherein the mold is constructed of two halves which are opened and closed so as to accomplish the removal of glassware which cannot be removed from conventional unitary glass molds, an example of such glassware being glassware with appendages such as handles.

It is yet another object of this invention to provide a mold operating linkage wherein the opening and closing of a pair of mold members is accomplished by an air cylinder utilizing relatively low air pressure and yet the mold, in the closed position, is capable of withstanding high forces tending to open the mold by means of cooperating wedge shaped locking members provided on a fixed support member and on linkage, which operatively interconnects the mold members to the air cylinder.

It is still another object of this invention to provide a mold operating mechanism, particularly for use in a glass molding machine of the continuous motion type, but not limited to the continuous motion type, wherein the mechanism is particularly characterized by its simplicity and economy in construction, manufacture and operation.

It is also a further object of this invention to provide a mold operating linkage in a continuous motion press wherein the mechanism is characterized by permitting a high production rate of glass articles, smoothness in operation, and resulting high quality products.

Further purposes and objects of this invention will appear as the specification proceeds.

The foregoing objects are accomplished by my glass molding machine which utilizes a mold operating linkage including a support member mounted on a rotary table of the glass making making machine, a pair of mating mold members being pivotally mounted about an axis parallel with the axis of the mold and on said support, an air cylinder drive means having an operating axis transverse of the axis of the mold for pivoting the mold members between open and closed positions, link members operatively connecting each of the mold members with the air drive cylinder, and cooperating locking members on the movable link means and on the fixed support member for positively locking the mold members in the closed position so as to resist relatively large external forces tending to open the mold members, the cooperating members also being constructed and arranged to release the mold members from the locked and closed position in response to relatively small opening forces from the air cylinder drive.

BRIEF DESCRIPTION OF THE DRAWINGS

One particular embodiment of the present invention is illustrated in the accompanying drawings wherein:

FIG. 4 is a sectional view taken along the line 4—4 of FIG. 3 illustrating the mold operating mechanism while in the closed position;

FIG. 5 is a view similar to FIG. 4, but showing the mold operating mechanism in the open position;

DETAILED DESCRIPTION OF THE PREFERRED EMBODIMENT

Figure 7:
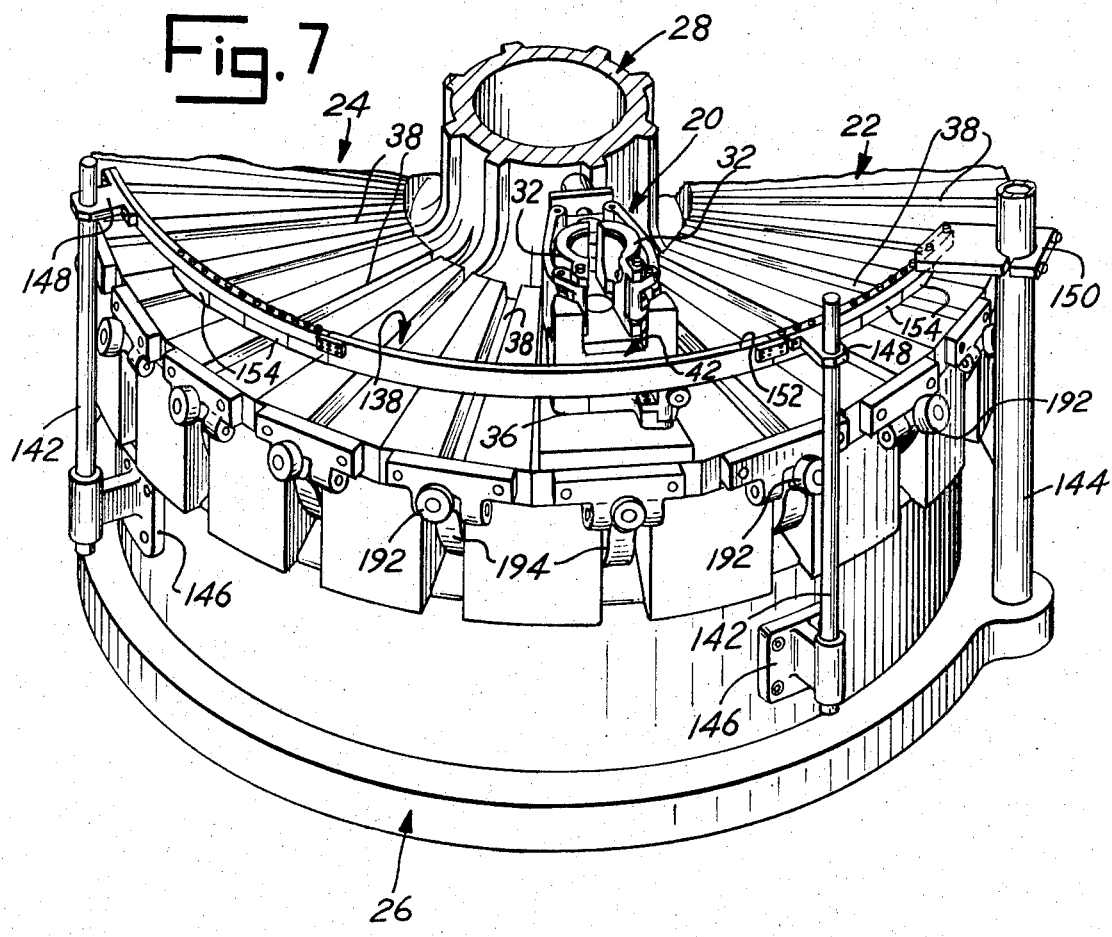
FIG. 7 is a partially broken, pictorial view of a continuous motion glass molding machine wherein one of my mold operating mechanisms is shown mounted thereon, while in the open position.

Referring to FIG. 7, one of my mold operating mechanisms, generally 20, is illustrated in position on a substantially horizontal, continuously rotating lower table, generally 22, of a continuous motion glass molding machine, generally 24. For purposes of simplicity in illustration, only one mold mechanism 24 is illustrated in FIG. 7, although it is to be understood that a multiplicity of such mold mechanisms as 24 in sumber, may be mounted on the table 22. Although the mold mechanism 20 described herein finds its greatest application in connecting with a continuous motion glass molding machine, it is to be understood that the mechanism 20 is useful with other types of glass molding equipment, including the individual section type and the indexing or intermittent motion type of glass making machine.

The glass making machine 24, illustrated partially in FIG. 7, includes a stationary base, generally 26, and an upright, stationary, central column 28, which projects upwardly from the central portion of the base 26. The central column 28, as shown in FIG. 7, is broken, but acts to rotatably carry an upper table (not shown), of the type fully described in my copending application, identified above, the disclosure of said application being incorporated herein by a reference. The continuously rotating upper table reciprocally carries rams or plungers, generally 30, as seen schematically in FIG. 6. These plungers are alignable above the mold mechanisms 20 and are reciprocally movable between a raised position and a lowered position within the cavity defined by each mold mechanism 20. The mechanical operation of the rams 30 as well as the structure and operation of the upper table is described in detail in my copending application Ser. No. 295,164.

Figure 3:
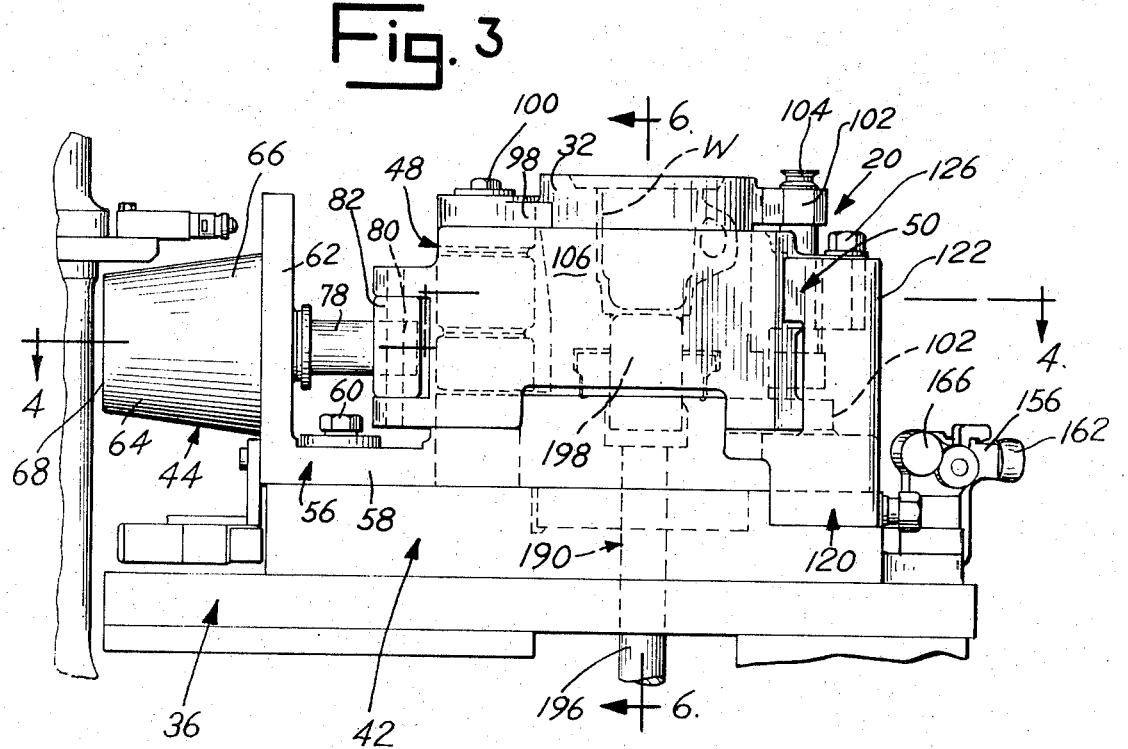
FIG. 3 is a side elevational view of the embodiment of FIG. 2.

Although the mechanism 20 is useful for the molding of a wide variety of glassware, it is to be understood that the principal purpose of the mechanism 20 is to permit the continuous motion glass molding machine 24 to be used for the molding of glassware of the type illustrated in FIG. 3. The ware W illustrated in hidden view FIG. 3, is formed in a generally upwardly and outwardly tapered mold and is formed with a handle portion thereon. If a unitary mold of the type illustrated in my said copending application is used, it would not be possible to remove ware of the type shown in FIG. 3 from the mold, because the handle could not be moved upwardly from the portion of the mold defining the handle. For this reason, the mechanism 20 includes a pair of mating mold members, generally 32, which are movable from the open position, as seen in FIG. 5, to the closed position of FIG. 4, thereby permitting the removal of the ware W, including the handle portion thereof, from the mold cavity 34 defined by the cooperating mold members 32.

Figure 1:
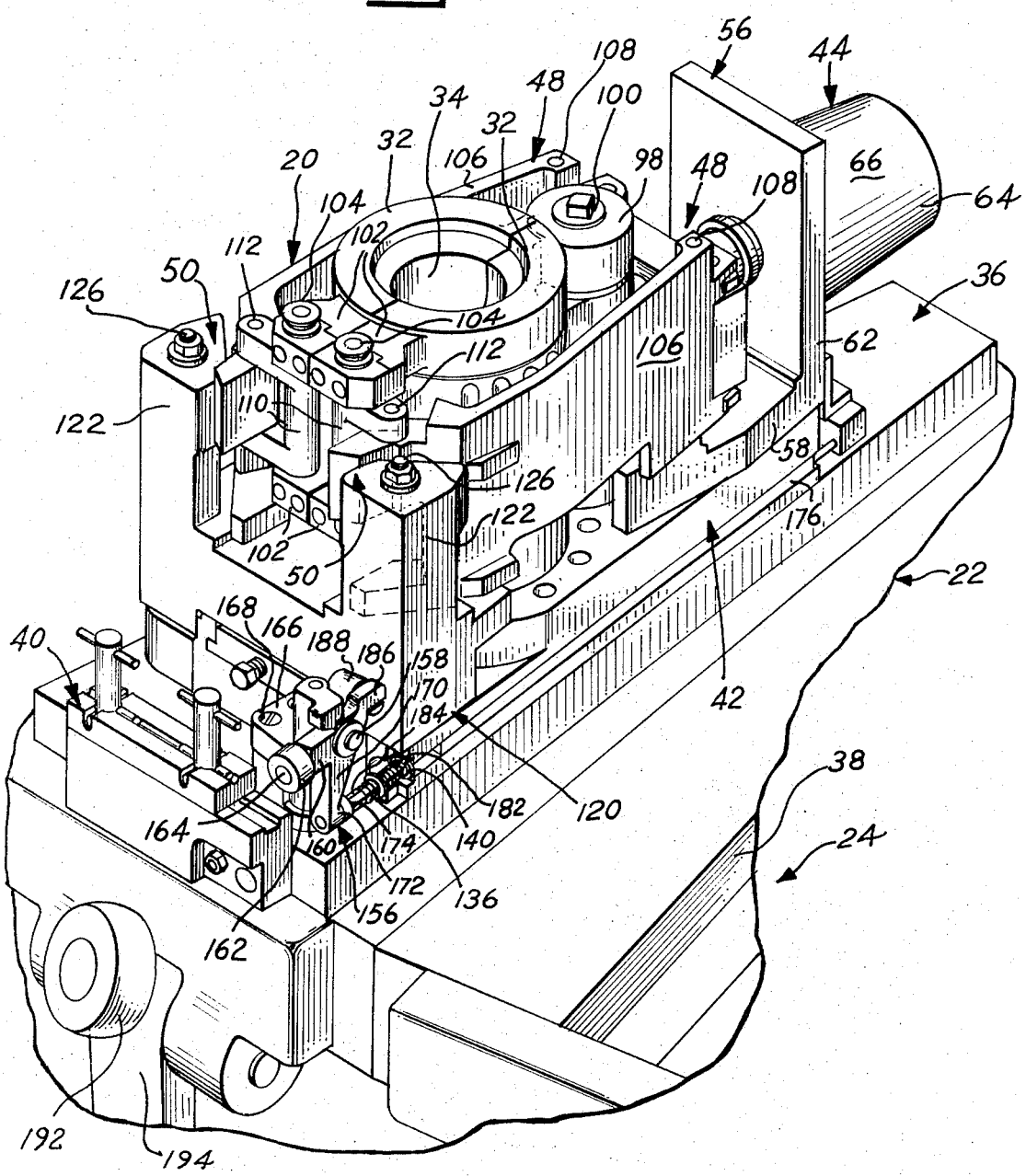
FIG. 1 is a pictorial view of one of my novel mold operating mechanisms mounted on the rotary table of a glass making machine.
Figure 2:
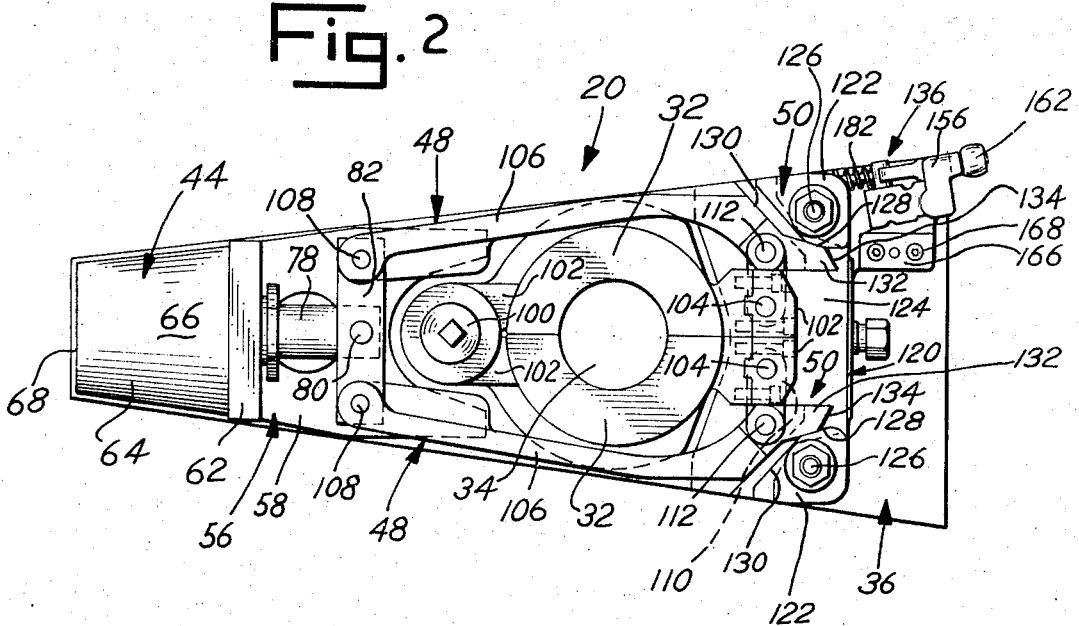
FIG. 2 is a tip plan view of the mold operating mechanism of FIG. 1 in the closed position.
Figure 6:
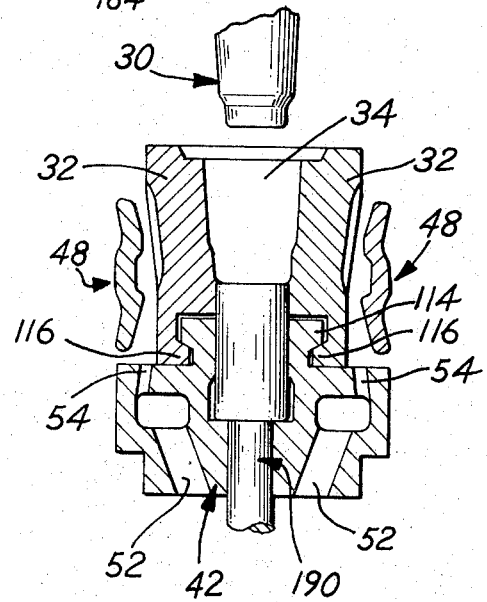
FIG. 6 is a transverse cross sectional view taken along the line 6—6 of FIG. 3 showing the mold in the closed position, with a plunger or ram positioned over the mold.

Referring to FIGS. 1 and 7, a mold slide member, generally 36, is radially movable and supported on the table 22 of the glass molding machine 24. The machine table 22, as best seen in FIGS. 1 and 7, includes a plurality of radial slots 38, which engage portions (not shown) of the slide member 36 for slidably guiding the slides 36 for radial movement from a retracted position to a radially extended position. The drive and operating mechanism for sliding the slide members 36 between inner and outer paths of travel is illustrated and described in my said copending application. In the operation of the slides 36, a molten glass gob is delivered to the mold cavity 34 from a glass delivery mechanism (not shown) when the mold cavity 34 has its upright axis moving in a path of travel having a 40 inch radius, for example, as taken from the upright axis of the machine column 28. After the glass gob is delivered to the mold, the slides 36 are moved inwardly, as described in my said prior application, to an inner arcuate path of travel having, for example, a 30 inch radius. The plunger or ram 30 then reciprocates downwardly into the mold cavity 34. During the time that the plunger 30 is within the mold cavity 34, the molten glass gob is forced into the space between the plunger or ram 30 and the mold members 32, as generally seen in FIG. 6. During the time, the ram 30 and mold members 32 are moving continuously and at the same time cooling wind or air is being directed against the outer surface of the mold members 32 for the cooling thereof and for setting the glass ware W into a hardened condition suitable for removal from the molds 32. After the ram 30 has remained within the mold cavity 34 for a preselected period of time, each ram 30 is lifted upwardly from the mold cavity 34 and the slide 36 is moved radially outwardly, to the outer arcuate path of travel, as a forty inch radius, used during the glass gob delivery. The ware W is then removed by the take-out mechanism (not shown), as described in my said copending application. The slide thereby functions as a carrier for the molds 32 to move them between inner and outer arcuate paths of travel.

Each slide 36 is slidably mounted on the table 22. As seen in FIG. 1, only, a clamp assembly, generally 40, may be selectively used to lock the slide out of operation. The clamp 40 has no bearing on the operation of the molds 32. The reciprocal sliding movement is imparted to the slide 36 by a linkage and cam mechanism, as described in my said copending application.

The mold operating mechanism 20, as seen pictorially in FIG. 1, generally includes a mold supporting basket member, generally 42, which is fixedly mounted on the slide member 36, an air drive cylinder assembly, generally 44, also fixedly mounted on the slide plate 36, the pair of pivotally mounted mold members, 32, a linkage assembly, generally 48, for operatively interconnecting the drive cylinder 44 to the mold members 32, and a locking assembly generally 50 for positively locking the mold members 32 in the closed position, as seen best in FIG. 1 and FIG. 4.

The basket 42 is constructed as a substantially flat casting and is rigidly secured to the upper surface of the slide plate 36 by suitable means, as by bolts or the like (not shown). The basket 42 has a principal function of acting as a support for the mold members 32, for the drive cylinder 44, for the linkage 48, and for the locking assembly 50. Additionally, as seen best in FIG. 6, the mold basket 42 has wind channels 52 which extend from the lower surface to the upper surface thereof with the openings 54 in the upper portion thereof directing cooling wind or air against the outer periphery of the mold members 32. The lower openings of the wind channels 52 communicate with wind openings (not shown) in the slide plate 36, which in turn, as seen in my said application, communicate with cooling wind sources in the glass molding machine 24 to impart cooling wind to the outer periphery of the mold members 32 to cool them and the ware W therein sufficiently to set the ware in preparation for removal from the molds 32. As seen best in FIGS. 4 and 5, the basket 42 is generally trapezoidal in plan view, having its minor dimension closest to the machine column 28 and its major dimension near the outer periphery of the machine table 22. The sides of the basket 42 taper laterally outwardly at substantially the same angle relative to the longitudinal axis of the basket 42.

The air drive cylinder assembly 44 includes a support bracket 56, which is rigidly secured to the upper, inner surface of the basket 42. The cylinder support 56 is generally L-shaped in side view, as seen best in FIGS. 3, 10 and 11, and includes a lower leg 58 which is rigidly secured to the upper face of the basket 42, as by bolts 60. A unitarily formed, upright leg 62 extends from the lower leg 58 and rigidly supports a cylinder 64 of the drive cylinder assembly 44. The cylinder 64 is mounted in a substantially horizontal position and includes a frusto-conical side wall 66 and a unitary rear wall 68. An air cylinder chamber 70 is defined within the cylinder 64, between the side wall 66, the rear wall 68, and an annular front bushing 72. The bushing 72, defining the front wall of the chamber 70, is rigidly secured by any suitable means to the side wall 66 and is also rigidly secured with an aperture located in the upper central portion of the upright leg 62 of the cylinder support 66. A bearing seal 74 is secured within the bushing 72. A piston 76 is slidably positioned within the cylinder chamber 70, and a piston rod 78 is secured to the front or outer side of the piston 76 and sealably and slidably passes through the bearing seal 74. The front portion of the rod 78 projects outwardly beyond the bearing seal 74 and is secured, as by a pin 80, to a substantially upright connecting plate 82.

Figure 10:
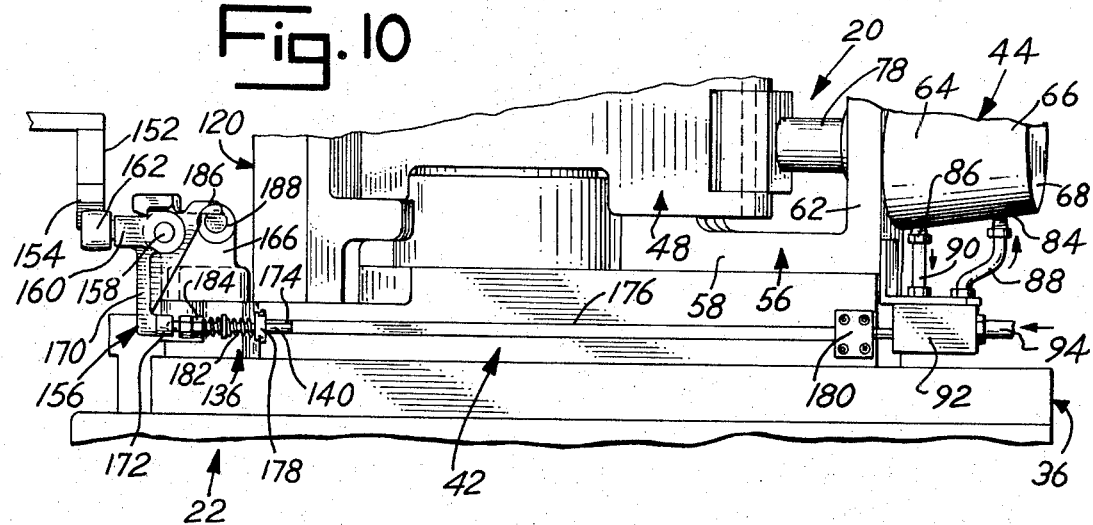
FIG. 10 is a side elevational view taken along line 10—10 of FIG. 9, illustrating the mold operating mechanism in the closed position.
Figure 11:
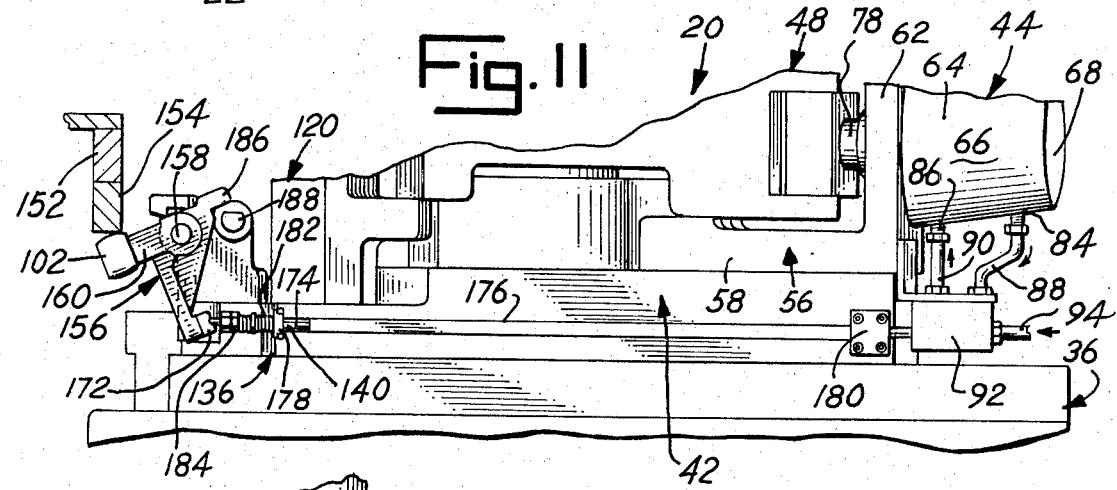
FIG. 11 is a side elevational view taken along the line 11—11 of FIG. 10, illustrating the mold operating mechanism, when the mold members are in the open position.

The cylinder assembly 44 is air operated, normally by air plant pressure at, for example, about 40 psi. The cylinder 44 is a double acting cylinder and includes two outlets 84 and 86, as best seen in FIGS. 10 and 11, which alternately communicate with the high pressure side and the low pressure side of the piston 76. The outlets connect with conduits 88 and 90 which, in turn, interconnect with an air valve 92, which upon activation, reverses the air flow between the opposite sides of the piston 76 to cause reciprocation thereof within the cylinder chamber 70. The air valve communicates with an air supply 94, at the desired air pressure.

The mold members 32, as shown, generally comprise similarly constructed castings which define, in the closed position, the upwardly opening mold cavity 34. In the closed position, the mold members define the mold cavity 34. The internal shape may be of any desired shape, provided a plunger 30 may be moved down into the cavity and removed therefrom and also provided that the ware W may be removed therefrom by moving the mold members 32 laterally apart and by lifting the ware W directly upwardly for removal.

The exterior of the mold members 32, in the closed position, defines a substantially cylindrical outer peripheral portion. Each mold half 32 includes a rearwardly projecting pivot support portion 98 which is pivotally connected to an upright pivot rod 100 which, in turn, is rigidly secured to the mold basket 42. As seen best in FIGS. 4 and 5, the mold members 32 each pivot towards and from each other, about the upright pivot rod 100, for opening and closing the mold cavity 34. Each of the mold members 32 includes a pair of frontwardly extending, spaced upper and lower ears 102 which are provided for pivotally interconnecting them to the linkage assembly 48 by upright pivot pins 104. The portion of the mold cavity 34 which defines the appendage, as the handle of the ware, is located along the interface of the mold members. In this way, when the molds part, the appendage or handle is free of the mold cavity and may be lifted up.

The linkage assembly 48 operatively interconnects the air drive cylinder 44 to the mold members 32 for opening and closing them. The linkage assembly 48 is generally comprised of two mold halves, having substantially the same construction. Each linkage half operates one of the mold members 32. Each linkage half includes a side link 106, which is pivotally interconnected to a lateral edge of the upright connecting plate 82, to which the piston rod 78 is secured. Each side link 106 is secured to the upright plate 82 by an upright pin 108. Each linkage assembly 48 also includes a connecting link 110 which is pivotally secured to the upright pivot pins 104 which pivotally interconnect with the front ears 102 of each of the mold members 32. An upright pivot pin 112 is provided for pivotally interconnecting each connecting link 110 to the front end of each side link 106.

As seen for example in FIG. 1 and in FIG. 3, each side link is relatively wide and acts to define a shroud around the outer periphery of the mold members 32, when in the closed position, so that wind openings 54 in the upper surface of the mold basket 42 direct wind directly against the mold members 32; the shroud effect provided by the wide side links 106 causes air to be directed against the molds 32 for the cooling thereof.

As seen best in FIG. 6, when the mold members 32 are pivoted to the closed position by the linkage assembly 48, the lower portions of the mold halves 32 interlock with an upright, substantially circular flange-defining portion 114 provided on the basket 42. Desirably, the interlocking engagement between the flange 114 and arcuate lower flanges 116 of the mold members 32, provides a wedging action therebetween, as a result of the tapered flanges, for securely locking the mold halves 32 in the locked position, while at the same time, the tapered or wedge shape guides the bottoms of the molds into the locked and engaged position with the central flange 114 on the basket 42.

In the structure 20, when a plunger 30, as shown in FIG. 6, moves downwardly into the mold cavity 34 for forming the ware W therein, the plunger 30 forces the molten glass gob in the bottom of the cavity 34, into the space defined between the plunger 30 and the walls defining the mold cavity 34. Particularly since the walls of the plunger and the walls of the cavity 34 are normally tapered, a substantial opening force, as over one thousand pounds, may be imparted to the mold members 32. It is therefore important to provide the locking assembly 50 to positively hold the mold members 32 in the fully closed position so as to resist the force tending to open the molds 32, as caused by the plunger 30.

The locking assembly 50 includes an upright lock plate, generally 120, which is rigidly secured to the upper surface of the mold basket 42. The plate 120 includes a pair of upright locking columns 122, with an open space 124 defined between the columns 122. Securing bolts 126 pass downwardly through the columns 122 and positively secure the lock plate 120 to the basket 42.

The details of the locking assembly 50 are best seen by referring to FIGS. 4 and 5. The locking columns 122 define the fixed or blocking portion of the locking assembly 50. The columns 122 include an outer, wedge shaped locking face 128 on the outer portion of the surface defining the inner face of each column. The inner face of each column 122 also includes a wedge face 130 having an inner face on each with a different angle than the adjacent outer wedge shaped locking face 128.

The other half of the locking assembly 50 is the moving half and includes a lock abutment 132 on each of the moving side links 106. The locking abutment or portion 132 projects outwardly beyond the pivot pin 112 and, in the closed position, the locking portion 132 is wedge shaped at the same angle as the wedge lock face 128 so as to provide a surface to surface, wedging relationship therebetween while in the closed position. As seen best in FIG. 5, when the locking portion 132 of the moving link is in the open position, an outer edge 134 is tapered or wedge shaped and is adapted to slide in surface to surface contact with the face 130 of the locking portion of each of the locking columns 122.

The locking operation or motion of the drive cylinder 44 which, in turn, operates the linkage 48 to open and close the mold members 32 is controlled by an air valve control assembly, generally 136. The air valve control assembly 136 includes a cam assembly, generally 138, which operates the valve operating linkage 140. The cam assembly 138, as seen best in FIG. 7, is nonmovably mounted above the outer periphery of the machine table 22 and is arcuate in shape. Upright support columns 142 are mounted on the side wall of the base 26 of the machine 24 and a main upright support column 144 is mounted on the base 26. Brackets 146 mount the columns 142 to the side of the base 26. The upper ends of the columns 142 have cam support brackets 148 rigidly mounted thereon. The upper portion of the main column 144 also includes a cam support bracket 150. The cam support brackets 148 and 150, in turn, rigidly support an arcuate cam support 152. The arcuate cam support 152 has an arcuate cam assembly 154 mounted on its underside, with the underface of the cam 154 defining a cam surface.

The valve operating linkage 140 includes a pivot member 156 which is pivotally carried on a pivot shaft 158, which has an axis transverse to the longitudinal axis of the mechanism 20. The pivot member 156 includes a forwardly extending arm 160 which carries a cam follower roller 162 at its outer end, the roller 162 being rotatable about a pivot shaft 164 having an axis substantially parallel with the longitudinal axis of the mechanism 20. As best seen in FIGS. 10 and 11, the periphery of the cam roller 162 is alignable with the undersurface of the cams 154.

The pivot shaft 158 which supports the cam follower support arm 160 is mounted on an upright support bracket 166 which is rigidly secured to the upper surface of the basket 42, as by bolts 168 or the like. The pivot member 156 also includes a downwardly extending arm 170 which has an inwardly facing head 172 which engages the outer end of a valve actuating shaft 174. The shaft 174 extends from the rear to the front of the basket 42 and is received within an elongated groove 176 located in one lateral edge of the basket 42. The shaft 174 is slidably maintained in place within the groove 176 by brackets 178 and 180 mounted at the front and rear portions, respectively of the groove 176. The front bracket 178 slidably supports the forward end of the shaft 174 on the basket 42 and has a biasing spring 182 mounted against its outer face, the spring 182 surrounding the outer end of the shaft 174. The outer end of the shaft 174 also has a nut 184 mounted thereon and the biasing spring 182 engages the inner face of the nut 184. The spring 182 thereby acts to normally bias the slidable shaft 174 forwardly with the outer end of the shaft 174 bearing against the head 172 on the arm 170 of the pivot member 156. The spring thereby ultimately biases the pivot member 156 about the pivot shaft 158 so that the arm 170 projects substantially downwardly and the forward arm 160 projects substantially forwardly. A stop portion 186 projects rearwardly from the pivot member 156, and is positioned for striking a rigid stop abutment 188 on the support member 166 for stopping further pivoting movement of the pivot member 156 by the spring 182.

As seen in FIGS. 10 and 11, the inner end of the shaft 174 is operatively interconnected to the air control valve 92 and, in a manner to be hereinafter described, causes reversal of air flow between the air outlets 84 and 86 in the air cylinder 64 in order to ultimately accomplish the desired opening and closing movement of the mold members 36.

Referring to FIGS. 3 and 6, a ware or article lifting mechanism 190 is shown. Referring also to FIG. 7, in the take-out position, a rigid cam (not shown) on the glass making machine 24 engages cam followers 192 shown in FIG. 7 to pivot an actuating arm 194 upwardly. The inner end of the arm (not shown) engages the lower end of a rod 196 which raises a plunger 198 upwardly to raise the ware W into the take-out position where the take-out mechanism (not shown) receives the ware to transfer it to a conveyor or the like. The take-out mechanism is described in detail in my said copending patent application. The plunger 198 defines the bottom of the mold cavity 34.

OPERATION

Although is is believed that the foregoing fully describes the invention, in order to provide an even more complete understanding of the invention, a brief description of the operation of the mechanism 20 will be provided.

As the cycle of operation of the mechanism 20 commences, a gob of molten glass at a high temperature is dropped vertically downwardly into the open upper end of the mold cavity 34, by any suitable delivery mechanism, preferably of the type described in my said above copending patent application. At this time, the mold members 32 are in the closed, abutting position, as seen in FIG. 1. The lift mechanism plunger 198 is down so as to define the bottom of the mold cavity 34, as seen in FIG. 6. Also, the drive cylinder 44 is in the position shown in FIG. 4, that is, with the piston 76 in the full forward position, and as seen in FIG. 10, pressurized air is being applied from the air valve 92 through the outlet 84 and lower pressure air is passing through the outlet 86 to the air valve 94 to maintain the piston in the forward position. At the same time, the locking assembly 50 is in the closed and locked position with the outer edge 134 of the locking portion 132 in locking engagement with the outer wedge face 128 of the locking columns 122. In this position, the locking assembly 50 positively holds the mold members 32 in the fully locked position and is capable of withstanding relatively high opening forces as hundreds of pounds.

After the molten glass gob has been dropped into the mold cavity 34, while the machine table 22 is rotating in a continuous horizontal path of travel, the plunger 30 moves vertically down into the mold cavity 34 so as to force the molten glass into the mold space defined between the plunger and the walls of the cavity 34. As indicated in FIG. 3, this mechanism 20 finds its greatest use when glass articles W being formed include an appendage, or the like, which normally prevents raising the ware W or formed glass product upwardly out of the tapered mold of the type set forth in my copending patent application identified above. As seen in FIG. 3, the ware W includes a handle portion thereon which would prevent removal of the ware W unless the molds 32 are opened. As indicated previously, the mold portion defining the handle on the W is along the parting surface between the movable mold halves 32.

During the time that the plunger 30 is in the cavity 96 to form the ware, such as seen in FIG. 6, cooling wind passes upwardly through the wind channels 52 and is directed against the outer periphery of the mold members 32, the outer periphery being preferably fluted to provide for a greater heat exchange area. The wide side links 106, in the closed position, also serve the important secondary function of acting as a shroud around the mold members 32 ao that the cooling wind effectively cools the closed mold 32 at the desired temperature level for properly setting the glassware W within the cavity 34.

When the ware W has been properly set, the mold slide 36, which slidably and radially carries the basket 42 and the entire mechanism 20 on the horizontally rotating table 22, moves outwardly to the take-out position, for removal of the ware W from the cavity 96. Before the slide 36 is moved radially outwardly by suitable mechanism, the plunger 30 is raised to the up position to permit the slide 36 and the mold members 32 to be moved outwardly.

Figure 8:
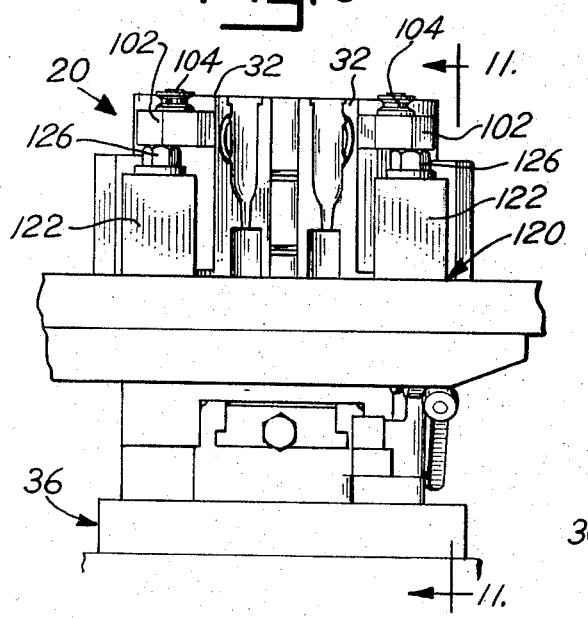
FIG. 8 is an end elevational view of the molding operating mechanism, as viewed from the outer periphery of the glass molding machine, with the mold being shown in the open position.
Figure 9:
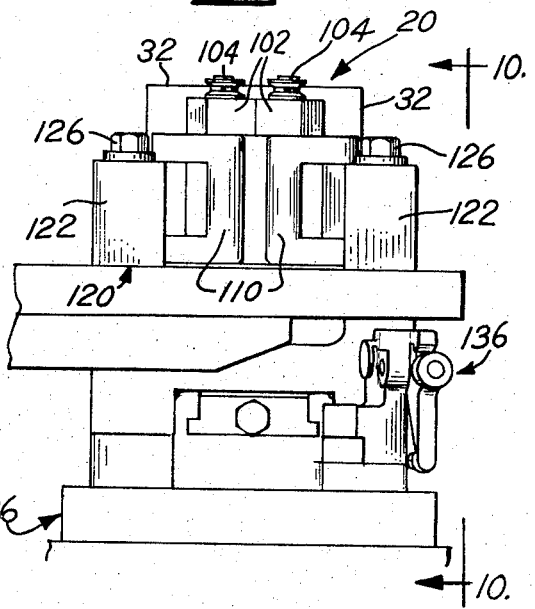
FIG. 9 is a view similar to FIG. 8 except the mold members are shown in the closed position.

At this time, the mold members 32 are still in the closed position, although as seen in FIGS. 9 and 10, the cam follower 162 on the pivot member 156 has moved into aligned position with the arcuate cam 154. As the table 22 continues rotating, the leading edge of the fixed cam 154 engages the moving cam follower 162 to pivot the arm 160 of the pivot member 156 downwardly, as best seen in FIGS. 8 and 11. When this occurs, the abutment head 172 on the pivot member 156 pushes the slide shaft 174 inwardly, which, in turn operates the air valve 92 to reverse air flow to the air drive cylinder 44. As seen in FIGS. 5 and 11, pressurized air then passes through the outlet 86 to drive the piston 76 rearwardly to the position shown in FIG. 5. The outlet 84 permits exhaust air to pass therefrom, permitting the rearward movement of the piston 76

The initial opening motion created by the reverse movement of the piston 76 within the cylinder chamber 70 is of great importance in initially releasing the locking engagement between the locking portion 132, which is integrally formed at the outer end of the side link 106 and the wedge faces 128 on the locking columns 122. The outer end of the piston rod 138 is connected to the central portion of the connecting plate 82. The connecting plate 82, in turn, is pivotally connected about upright axes to the side links 106. As the air pressure on the outer face of the piston 76 first moves the piston 76 rearwardly within the cylinder chamber 70, the links 106 and the outer locking portions 132 thereof move substantially radially inwardly along the wedge faces 128. Since, in the closed position, the connecting link 110 is substantially 90° of the longitudinal axis of the mechanism 20, that is, in substantial axial alignment with each other, only a slight opening movement is initially imparted to the mold members 32. As the locking portions 132 move free of the wedge faces 128, the connecting links 110 pivot relative to the link members 106. As the piston 75 continues its rearward travel, the link members 106 pivot at an increasing angle relative to the connecting plate 82 in a laterally outward direction, causing the pivoting connecting links 110 to pull the outer ends of the mold members 32 laterally outwardly while pivoting them about the upright rod 100. The opening movement continues until the piston rod 76 reaches the full back position, as seen in FIG. 5. At this time, the mold is completely open and the ware W as seen in hidden view in FIG. 5, is free of the side walls of the mold members and substantially rests on the plunger 198 of the lift mechanism 190. Also, the handle portion of the ware W is positioned along the surface of separation between the mold members 32. When the mold 32 is completely open, the table 22, which is continuously rotating, causes each cam follower 192 to strike a cam (not shown) to pivot each arm 194 to raise the rod 196 and plunger 198 upwardly and raise the ware W to the take out position for removal thereof from the mold area by a suitable take-out mechanism.

After the formed product or ware W has been removed from the vicinity of the mold members 32, the cam mechanism (not shown) releases the follower 192 to permit the arm 194 to lower the plunger 198 to the start position shown in FIG. 6. Also, the cam follower 162 on the pivot member 156 has rotated to the end of the cam surface 154 and is pivoted upwardly by action of the biasing spring 182, with the stop 186 avoiding further pivoting movement thereof. At the same time, the spring 182 pulls the actuating shaft 174 in a forward direction to again change the flow of air in the air valve 92 to the flow direction indicated in FIG. 10 so that the pressurized air enters the rear face of the piston 76 to move it forwardly to the start position of FIG. 4. As the piston 96 moves to the forward end of the stroke, the wedge faces 128 on the locking columns 122 engage the outer faces of the locking portion 132 on the links 106 and they are moved into firm wedging engagement to positively hold the mold members 32 in the closed and locked position, with sufficient locking force to withstand significant forces tending to open the molds from within.

As seen, with a relatively small opening and closing force, as from an air cylinder operating under plant air pressure, an open and shut linkage is provided for the mold members, which is simple, of relatively inexpensive construction, which is easily opened and closed and which withstands significant forces imparted by the plunger as it enters the mold cavity 34. The mold members are positively locked in a closed position as the ware is cooling and setting. The result is a ware W of extremely high quality.

While in the foregoing, there has been provided a detailed description of a particular embodiment of the present invention, it is to be understood that all equivalents obvious to those having skill in the art are to be included within the scope of the invention, as claimed.

I claim:

1. A mold operating mechanism for opening and closing a mold for forming articles therein under relatively high molding pressures between a pair of molds and a ram, said mechanism comprising, in combination, a support member having first and second rigid portions, a pair of mating mold members, movably mounted on said support member, fluid pressure drive means operated by relatively low pressures for moving said mold members between a closed, article molding position, and an open position for releasing the molded article from the mold, first and second link means for operatively interconnecting each of said mold members with said drive means, and cooperating means on each of said link means and on each rigid portion for locking each of said mold members in the closed position for resisting relatively large external forces from said molding pressures normally tending to open said mold, said drive means and said cooperating means holding said mold members in the closed molding position, said cooperating means also being constructed and arranged to facilitate release of said mold members from the locked and closed position, in response to relatively low opening pressures from said drive means.

2. The mechanism of claim 1 including a continuously rotating table, said support member is mounted on said table, said mold members define an upwardly opening mold chamber, and said ram comprises a vertically reciprocal plunger ram movable in and out of said mold chamber for forming said articels therein.

3. The mechanism of claim 2 wherein said mechanism is mounted on a continuously moving glass molding machine, and the article being formed in said mold comprises glassware formed in said mold chamber defined between said plunger and walls defining the closed mold.

4. The mechanism of claim 1 wherein said drive means comprises an air cylinder, said mold members are pivotally mounted about an upright axis on said support, and said drive means simultaneously pivotally move said mold members between an open position for releasing the article being molded and a closed position during which said article is being molded.

5. The mechanism of claim 1 including means for directing mold cooling air upwardly past said mold members and said link means define a shroud for assisting in directing sid cooling air against said mold members.

6. The mechanism of claim 1 wherein said cooperating means includes a fixed locking portion on each said rigid portion and a movable locking portion on each said link means, said movable locking portion on said link means being in locking engagement with said fixed locking portion on said rigid portion when said mold members are in the closed position.

7. The mechanism of claim 6 wherein said fixed locking portion on said rigid portion and said moving locking portion on said link means are each wedge shaped to provide for ease of relative movement therebetween when said cooperating lock means are moving between the open and closed positions and also for assuring complete closing of the mold members.

8. In a continuously rotating glassware molding machine, a combination of a continuously horizontally rotating support table, a support member mounted on said table, a pair of rigid portions on said support member, a pair of main mold members pivotally mounted on said support member, an open upper end for receiving molten glass defined within said mold members, ram means for moving through said open upper end for molding glassware under relatively high molding pressure and between said ram means and said mold members, fluid pressure drive means for moving said mold members between a closed, article molding position, and an open position for releasing the molded article, a pair of link means operatively interconnecting each of said mold members with said drive means, and cooperating means on each of said link means and on each of said rigid portions for locking said mold members in the closed position for resisting relatively large external forces tending to open said mold members from said molding pressures with relatively low pressures from said fluid pressure drive means said cooperating means also being constructed and arranged to facilitate the release of said mold members from the locked and closed position, in response to relatively small opening pressures from said drive means.

9. The mechanism of claim 8 wherein said drive means comprises an air cylinder, said mold members are pivotally mounted about an upright axis on said support, and said drive means pivotally move said mold members between an open position for releasing the article being molded and a closed position during which said article is being molded.

10. The mechanism of claim 8 including means for directing mold cooling air upwardly past said mold members and said link means define a shroud for assisting in directing said cooling air against said mold members.

11. The mechanism of claim 8 wherein said cooperating means includes a fixed locking portion on each said rigid portion and a movable locking portion on each said link means, each said locking portion on said link means being in locking engagement with each said fixed locking portion on each said rigid portion when said mold members are in the closed position.

12. The mechanism of claim 10 wherein each said fixed locking portion on each said rigid portion and each said moving locking portion on said link means are wedge shaped to provide for ease of relative movement therebetween when said cooperating means are moving between the open and closed positions and also for assuring complete closing of the mold members.

* * * * *